US012652218B2

(12) United States Patent
Kahn et al.

(10) Patent No.: US 12,652,218 B2
(45) Date of Patent: Jun. 9, 2026

(54) DCCF-DCCF COORDINATION

(71) Applicant: Nokia Technologies Oy, Espoo (FI)

(72) Inventors: Colin Kahn, Murray Hill, NJ (US);
Gerald Kunzmann, Munich (DE);
Yannick Lair, Massy (FR); **Saurabh
Khare**, Bangalore (IN)

(73) Assignee: Nokia Technologies Oy, Espoo (FI)

( * ) Notice: Subject to any disclaimer, the term of this
patent is extended or adjusted under 35
U.S.C. 154(b) by 117 days.

(21) Appl. No.: 18/692,669

(22) PCT Filed: Sep. 17, 2021

(86) PCT No.: PCT/EP2021/075663
§ 371 (c)(1),
(2) Date: Mar. 15, 2024

(87) PCT Pub. No.: WO2023/041174
PCT Pub. Date: Mar. 23, 2023

(65) Prior Publication Data
US 2024/0396796 A1    Nov. 28, 2024

(51) Int. Cl.
*H04L 41/0816* (2022.01)
(52) U.S. Cl.
CPC ................................ *H04L 41/0816* (2013.01)
(58) Field of Classification Search
CPC ............................ H04L 41/0816; H04W 24/10
See application file for complete search history.

(56) References Cited

U.S. PATENT DOCUMENTS

2023/0071081 A1*  3/2023  Hong ...................... H04L 41/142
2024/0244434 A1*  7/2024  Comak ................ H04W 12/106
(Continued)

FOREIGN PATENT DOCUMENTS

EP          3703399 A1    9/2020
WO    2021/109452 A1    6/2021

OTHER PUBLICATIONS

"3rd Generation Partnership Project; Technical Specification Group
Services and System Aspects; Procedures for the 5G System (5GS);
Stage 2 (Release 17)", 3GPP TS 23.502, V17.1.0, Jun. 2021, pp.
1-692.

(Continued)

*Primary Examiner* — Farzana B Huq
(74) *Attorney, Agent, or Firm* — Nokia Technologies Oy

(57)                  ABSTRACT

A method at a first data collection coordination functional
entity for coordinating, in a first area, a data and/or analytics
collection related to at least one mobile terminal, the method
comprising: determining, based on an obtained mobile ter-
minal mobility event notification, that the at least one mobile
terminal is no longer in the first area and/or no longer in a
second area served by a first messaging framework adaptor
functional entity; based thereon, identifying at least one of
a second data collection coordination functional entity coor-
dinating a data and/or analytics collection in a third area in
which the at least one mobile terminal resides if it does not
reside in the first area and a second messaging framework
adaptor functional entity serving a fourth area in which the
at least one mobile terminal resides if it does not reside in the
second area; and based thereon, initiating a transfer or a
setup of at least one of a respective data collection coordi-
nation functional entity context associated with the at least
one mobile terminal to or at the second data collection
coordination functional entity and a respective messaging
framework adaptor functional entity context associated with
the at least one mobile terminal to or at the second messag-
ing framework adaptor functional entity.

15 Claims, 11 Drawing Sheets

(56) References Cited

U.S. PATENT DOCUMENTS

2024/0314027 A1* 9/2024 Fu ....................... H04L 41/0806
2024/0380744 A1* 11/2024 Comak .............. H04L 63/0807

OTHER PUBLICATIONS

International Search Report and Written Opinion received for corresponding Patent Cooperation Treaty Application No. PCT/EP2021/075663, dated May 12, 2022, 14 pages.
"3rd Generation Partnership Project; Technical Specification Group Services and System Aspects; Architecture enhancements for 5G System (5GS) to support network data analytics services (Release 17)", 3GPP TS 23.288, V17.2.0, Sep. 2021, pp. 1-196.
"Miscellaneous correction for TS 23.288", 3GPP TSG-SA2 Meeting #146-e, S2-2106625, vivo, Aug. 16-27, 2021, 60 pages.
"New Solution on DCCF relocation", 3GPP TSG-WG SA2 Meeting #150E e-meeting, S2-2202690, Agenda: 9.23, China Mobile, Apr. 6-12, 2022, 4 pages.
"KI: Key Issue for WT#3.1", SA WG2 Meeting #149E, S2-2201072, Agenda: 9.23, Nokia, Feb. 14-25, 2022, 2 pages.
"3rd Generation Partnership Project, Technical Specification Group Services and System Aspects; Architecture enhancements for 5G System (5GS) to support network data analytics services (Release 18)", 3GPP TS 23.288, V18.4.0, Dec. 2023, pp. 1-318.
"Solution proposal: KI#4: Data Collection and Storage Enhancements", 3GPP SA WG2 Meeting #150E, S2-2202873, Agenda: 9.23, Nokia, Apr. 6-12, 2022, pp. 1-7.

* cited by examiner

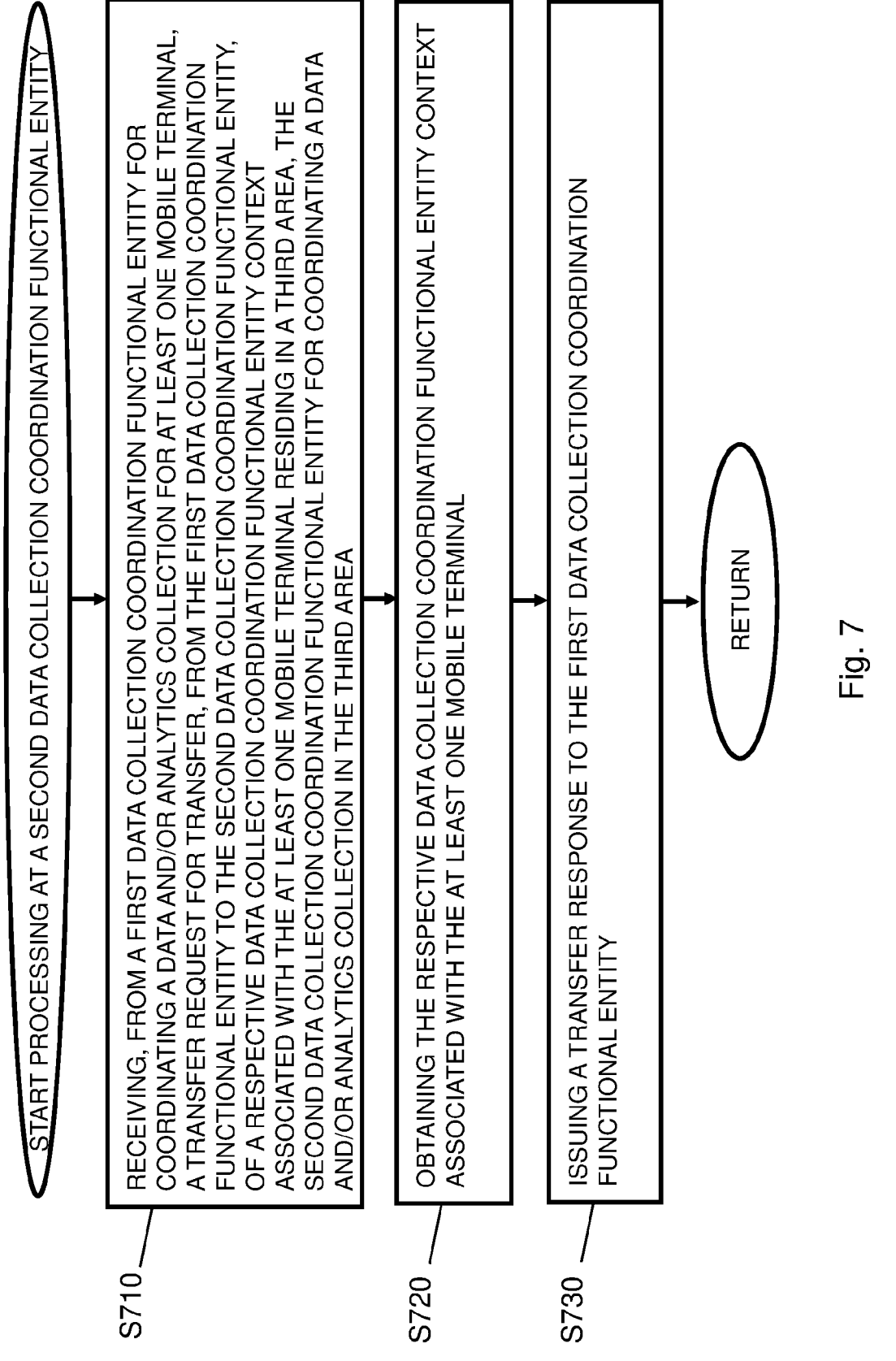

START PROCESSING AT A SECOND DATA COLLECTION COORDINATION FUNCTIONAL ENTITY

S710 — RECEIVING, FROM A FIRST DATA COLLECTION COORDINATION FUNCTIONAL ENTITY FOR COORDINATING A DATA AND/OR ANALYTICS COLLECTION FOR AT LEAST ONE MOBILE TERMINAL, A TRANSFER REQUEST FOR TRANSFER, FROM THE FIRST DATA COLLECTION COORDINATION FUNCTIONAL ENTITY TO THE SECOND DATA COLLECTION COORDINATION FUNCTIONAL ENTITY, OF A RESPECTIVE DATA COLLECTION COORDINATION FUNCTIONAL ENTITY CONTEXT ASSOCIATED WITH THE AT LEAST ONE MOBILE TERMINAL RESIDING IN A THIRD AREA, THE SECOND DATA COLLECTION COORDINATION FUNCTIONAL ENTITY FOR COORDINATING A DATA AND/OR ANALYTICS COLLECTION IN THE THIRD AREA

S720 — OBTAINING THE RESPECTIVE DATA COLLECTION COORDINATION FUNCTIONAL ENTITY CONTEXT ASSOCIATED WITH THE AT LEAST ONE MOBILE TERMINAL

S730 — ISSUING A TRANSFER RESPONSE TO THE FIRST DATA COLLECTION COORDINATION FUNCTIONAL ENTITY

RETURN

Fig. 7

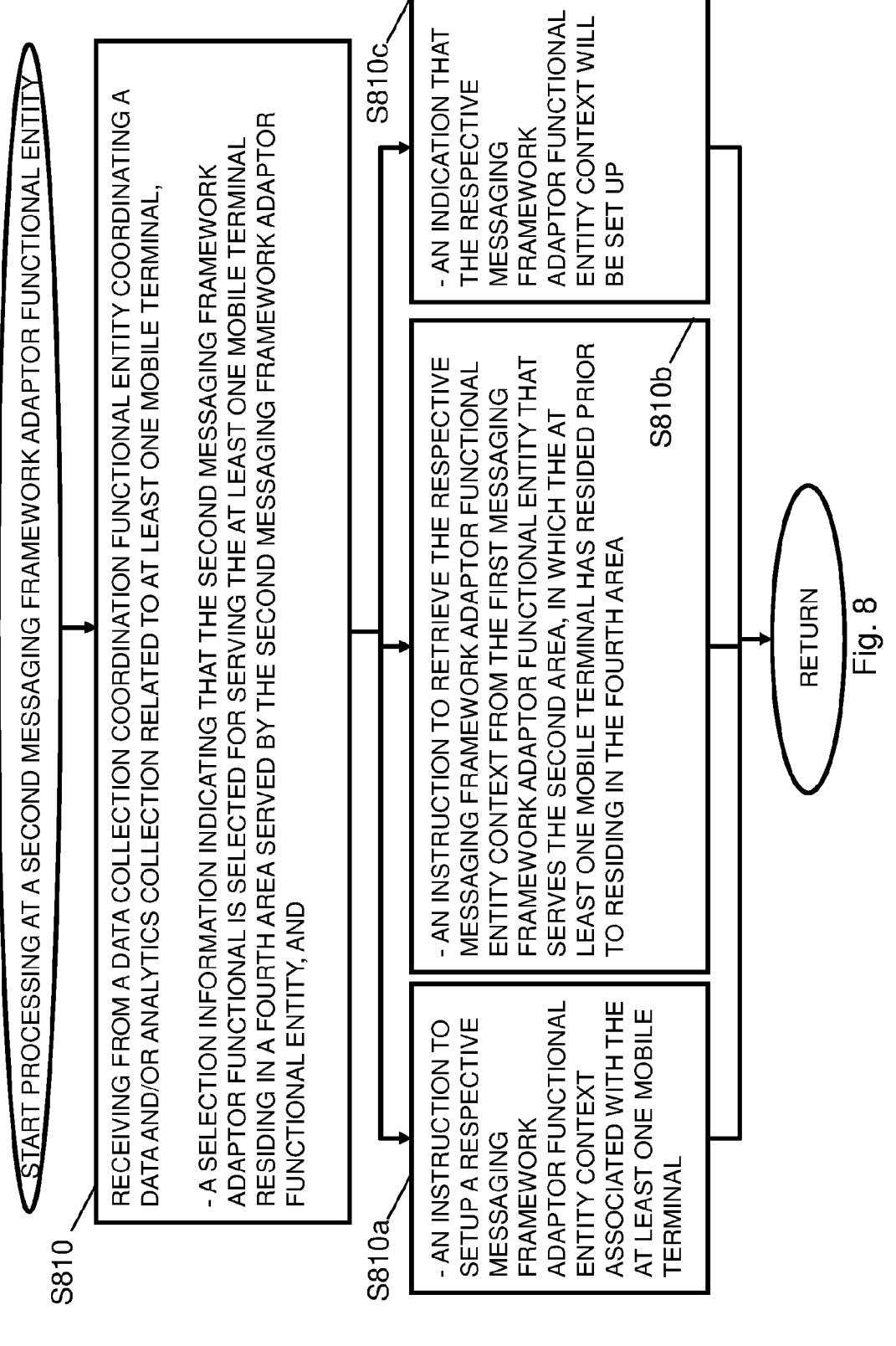

START PROCESSING AT A SECOND MESSAGING FRAMEWORK ADAPTOR FUNCTIONAL ENTITY

S810

RECEIVING FROM A DATA COLLECTION COORDINATION FUNCTIONAL ENTITY COORDINATING A DATA AND/OR ANALYTICS COLLECTION RELATED TO AT LEAST ONE MOBILE TERMINAL,

- A SELECTION INFORMATION INDICATING THAT THE SECOND MESSAGING FRAMEWORK ADAPTOR FUNCTIONAL IS SELECTED FOR SERVING THE AT LEAST ONE MOBILE TERMINAL RESIDING IN A FOURTH AREA SERVED BY THE SECOND MESSAGING FRAMEWORK ADAPTOR FUNCTIONAL ENTITY, AND

S810a

- AN INSTRUCTION TO SETUP A RESPECTIVE MESSAGING FRAMEWORK ADAPTOR FUNCTIONAL ENTITY CONTEXT ASSOCIATED WITH THE AT LEAST ONE MOBILE TERMINAL

S810b

- AN INSTRUCTION TO RETRIEVE THE RESPECTIVE MESSAGING FRAMEWORK ADAPTOR FUNCTIONAL ENTITY CONTEXT FROM THE FIRST MESSAGING FRAMEWORK ADAPTOR FUNCTIONAL ENTITY THAT SERVES THE SECOND AREA, IN WHICH THE AT LEAST ONE MOBILE TERMINAL HAS RESIDED PRIOR TO RESIDING IN THE FOURTH AREA

S810c

- AN INDICATION THAT THE RESPECTIVE MESSAGING FRAMEWORK ADAPTOR FUNCTIONAL ENTITY CONTEXT WILL BE SET UP

RETURN

Fig. 8

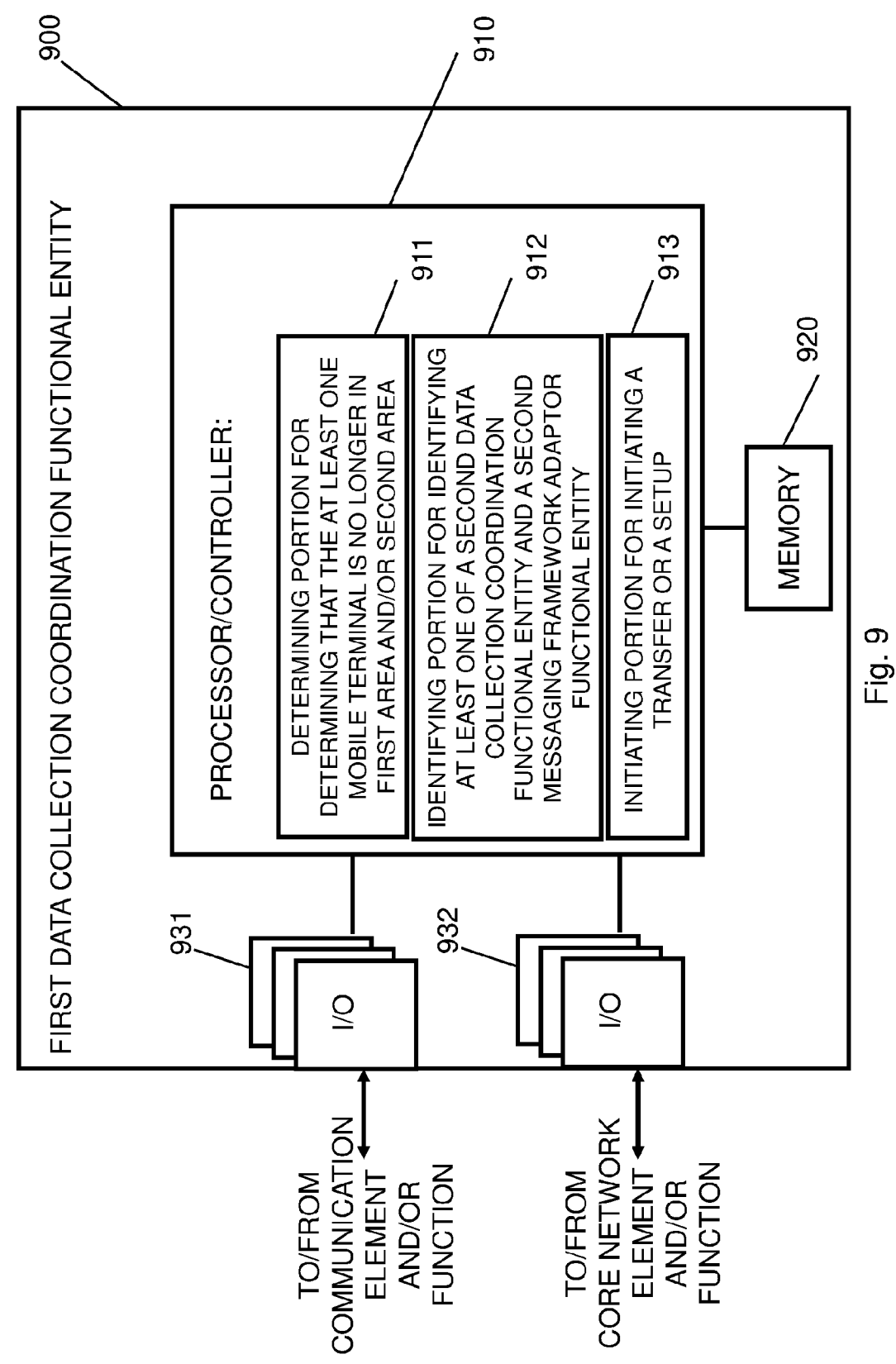

FIRST DATA COLLECTION COORDINATION FUNCTIONAL ENTITY

900

910

PROCESSOR/CONTROLLER:

911
DETERMINING PORTION FOR DETERMINING THAT THE AT LEAST ONE MOBILE TERMINAL IS NO LONGER IN FIRST AREA AND/OR SECOND AREA

912
IDENTIFYING PORTION FOR IDENTIFYING AT LEAST ONE OF A SECOND DATA COLLECTION COORDINATION FUNCTIONAL ENTITY AND A SECOND MESSAGING FRAMEWORK ADAPTOR FUNCTIONAL ENTITY

913
INITIATING PORTION FOR INITIATING A TRANSFER OR A SETUP

920
MEMORY

931
I/O

932
I/O

TO/FROM COMMUNICATION ELEMENT AND/OR FUNCTION

TO/FROM CORE NETWORK ELEMENT AND/OR FUNCTION

Fig. 9

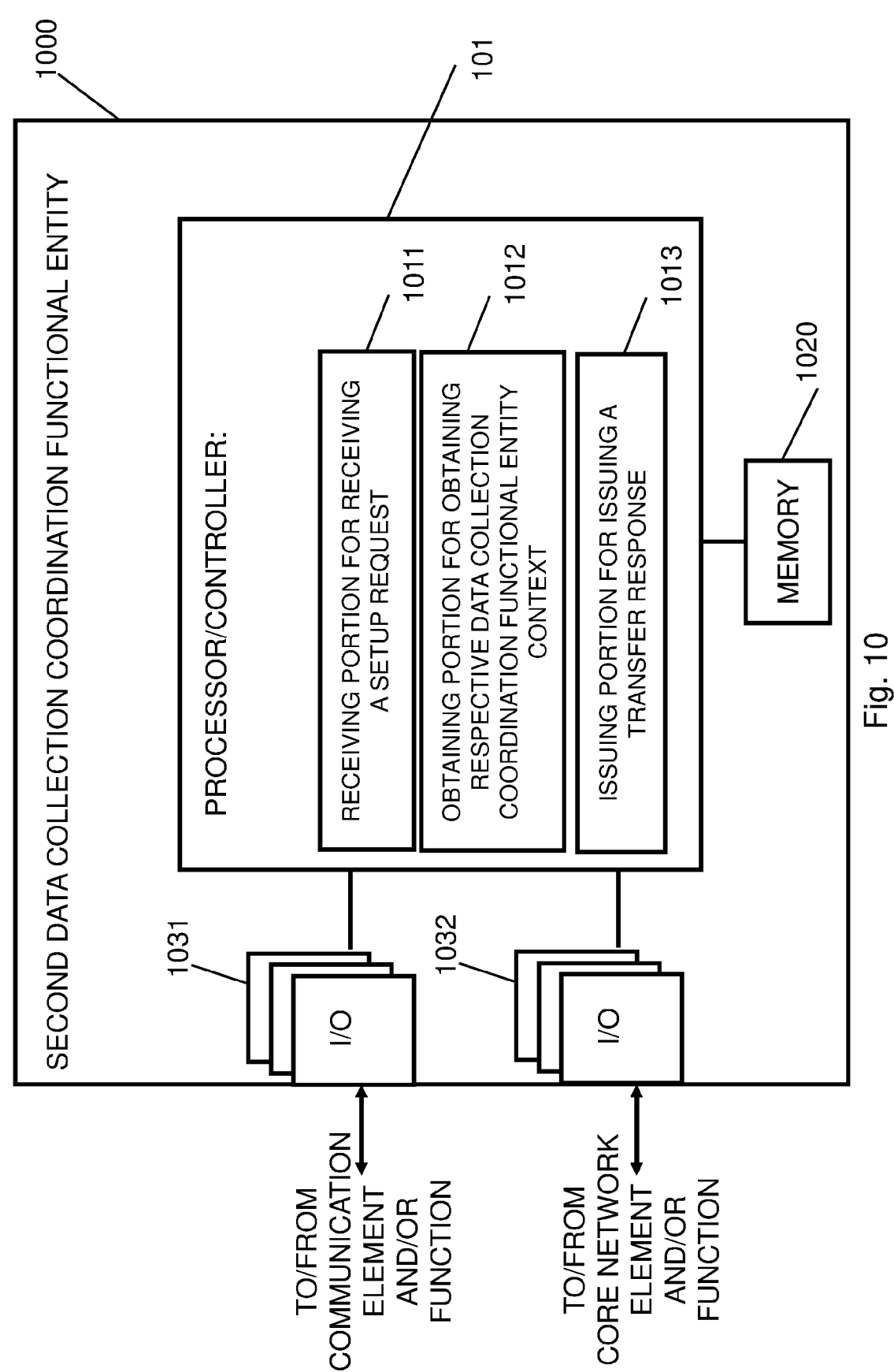

1000

101

SECOND DATA COLLECTION COORDINATION FUNCTIONAL ENTITY

PROCESSOR/CONTROLLER:

RECEIVING PORTION FOR RECEIVING A SETUP REQUEST — 1011

OBTAINING PORTION FOR OBTAINING RESPECTIVE DATA COLLECTION COORDINATION FUNCTIONAL ENTITY CONTEXT — 1012

ISSUING PORTION FOR ISSUING A TRANSFER RESPONSE — 1013

MEMORY — 1020

I/O — 1031

I/O — 1032

TO/FROM COMMUNICATION ELEMENT AND/OR FUNCTION

TO/FROM CORE NETWORK ELEMENT AND/OR FUNCTION

Fig. 10

DCCF-DCCF COORDINATION

CROSS-REFERENCE TO RELATED APPLICATIONS

This application is a national stage application, filed under 35 U.S.C. § 371, of International Patent Application No. PCT/EP2021/075663, filed on Sep. 17, 2021, which is hereby incorporated herein by reference.

TECHNICAL FIELD

The present disclosure relates to a method and an apparatus for coordination between Data Collection Coordination Function (DCCF) instances.

BACKGROUND ART

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Regarding DCCF, for eNA in 3GPP Release 17, DCCF may be used to coordinate data collection related to data and analytics within a specified area. When a DCCF is coordinating data or analytics collection, the data may be sent either via the DCCF as shown in FIG. 1, or via a messaging framework with a Messaging Framework Adaptor Function (MFAF) as shown in FIG. 2. Like other Network Functions (NFs) within the 5G Core (5GC), a DCCF (or DCCF set) and MFAF (or MFAF set) may serve a limited area (e.g.: consisting of one or more Tracking Area Identifiers (TAIs)). The areas served by the DCCF and MFAF may be different, but may also be the same or at least partially overlapping.

The DCCF coordinates Data Sources within its serving area, and may receive data from those Data Sources. Similarly, when an MFAF is used, it receives data from Data Sources in its serving area. Note that each Data Source is normally associated with one DCCF and optionally one MFAF. Initially when a consumer NF requires data or analytics, it may determine the DCCF that serves a desired area (e.g.: an area where a user equipment (UE) resides) from the DCCF profile obtained by querying the Network Resource Function (NRF). Similarly, when the DCCF selects an MFAF to deliver data or analytics, it may select the MFAF according to the area that the MFAF serves (e.g.: the area where the UE resides) by obtaining the MFAF profile from the NRF.

However, problems may arise when a UE moves, e.g. as part of idle mode mobility and/or as part of a handover.

It is therefore an object of the present disclosure to improve the prior art.

The following meanings for the abbreviations used in this specification apply:

2G Second Generation
3G Third Generation
3GPP $3^{rd}$ Generation Partnership Project
3GGP2 $3^{rd}$ Generation Partnership Project 2
4G Fourth Generation
5G Fifth Generation
5GC 5G Core
6G Sixth Generation
AMF Access and Mobility Management Function
AN Access Node
AOI Area of Interest
AP Access Point
BS Base Station
CDMA Code Division Multiple Access
DCCF Data Collection Coordination Function
DSL Digital Subscriber Line
EDGE Enhanced Data Rates for Global Evolution
EEPROM Electrically Erasable Programmable Read-only Memory
eNB Evolved Node B
eNA enablers for Network Automation
ETSI European Telecommunications Standards Institute
gNB Next Generation Node B
GPRS General Packet Radio System
GSM Global System for Mobile communications
IEEE Institute of Electrical and Electronics Engineers
ISDN Integrated Services Digital Network
ITU International Telecommunication Union
LTE Long Term Evolution
LTE-A Long Term Evolution-Advanced
MANETs Mobile Ad-Hoc Networks
MFAF Messaging Framework Adaptor Function
NB Node B
NF Network Function
NRF Network Resource Function
NWDAF Network Data Analytics Function
PCF Policy Control Function
RAM Random Access Memory
RAN Radio Access Network
ROM Read Only Memory
SMF Session Management Function
TAI Tracking Area Identifier
TISPAN Telecoms & Internet converged Services & Protocols for Advanced Networks
UE User Equipment
UMTS Universal Mobile Telecommunications System
UWB Ultra-Wideband WCDMA Wideband Code Division Multiple Access WIMAX Worldwide Interoperability for Microwave Access WLAN Wireless Local Area Network

SUMMARY

It is an objective of various examples of embodiments of the present disclosure to improve the prior art. Hence, at least some examples of embodiments of the present disclosure aim at addressing at least part of the above issues and/or problems and drawbacks.

Various aspects of examples of embodiments of the present disclosure are set out in the appended claims and relate to methods, apparatuses and computer program products relating to DCCF-DCCF coordination.

The objective is achieved by the methods, apparatuses and non-transitory storage media as specified in the appended claims. Advantageous further developments are set out in respective dependent claims.

Any one of the aspects mentioned according to the appended claims enables DCCF-DCCF coordination, thereby allowing to solve at least part of the problems and drawbacks as identified/derivable from above.

Thus, improvement is achieved by methods, apparatuses and computer program products enabling DCCF-DCCF coordination. Hence, the present specification discloses DCCF-DCCF coordination, which is advantageous over a proprietary solution for the following reasons.

In particular, when a UE moves (e.g. as part of idle mode mobility or as part of a handover), the data or analytics source may change (e.g.: a new Network Data Analytics Function (NWDAF), a new Access and Mobility Management Function (AMF), a new Session Management Function (SMF)). The new data source may not be in the area served by the current DCCF and/or the current MFAF. Currently, however, nothing is specified in 3GPP standards on what happens when a UE moves outside of the area served by a DCCF or a MFAF. This leads to anomalous behavior since notification endpoints are unchanged and hence notifications will continue to be sent to the old DCCF (DCCF-1) or old MFAF (MFAF-1), even though they may be outside of the area served by the new data source. For example, if due to the UE location change:

1. the DCCF is supposed to change (e.g.: DCCF-1 to DCCF-2) but not the MFAF (or if there is no MFAF), then subsequent requests by a consumer for the same data will go to DCCF-2 which is selected by the consumer based on the UE's new location. But DCCF-2 knows nothing about the data still being delivered to the MFAF (or DCCF-1 if there is no MFAF) due to the original (previous) request sent to DCCF-1. DCCF-2 would hence request duplicate data from the Data Source.

2. the MFAF is supposed to change (e.g.: MFAF-1 to MFAF-2) but not the DCCF, then a subsequent request by a consumer for the same data will go to the DCCF, which based on the UE's new location would select MFAF-2 to deliver the data to the new consumer. But MFAF-2 is not receiving the data, and hence the request cannot be fulfilled by MFAF-2.

3. both the DCCF and the MFAF are supposed to change (DCCF-1 to DCCF-2 and MFAF-1 to MFAF-2), then a subsequent request by a consumer for the same data will go to DCCF-2, which again is selected by the consumer based on the UE's new location. But DCCF-2 knows nothing about the data still being delivered to MFAF-1 due to the original request sent to DCCF-1. DCCF-2 would hence request duplicate data from the Data Source, specifying MFAF-2 as the notification endpoint.

The present disclosure allows to solve these problems.

Further advantages become apparent from the following detailed description in combination with the appended drawings.

BRIEF DESCRIPTION OF THE DRAWINGS

Some embodiments of the present disclosure are described below, by way of example only, with reference to the accompanying drawings, in which:

FIG. 7 shows a flowchart illustrating steps corresponding to a method according to various examples of embodiments;

FIG. 8 shows a flowchart illustrating steps corresponding to a method according to various examples of embodiments;

FIG. 9 shows a block diagram illustrating an apparatus according to various examples of embodiments;

FIG. 10 shows a block diagram illustrating an apparatus according to various examples of embodiments.

DESCRIPTION OF EMBODIMENTS

Figure 1:
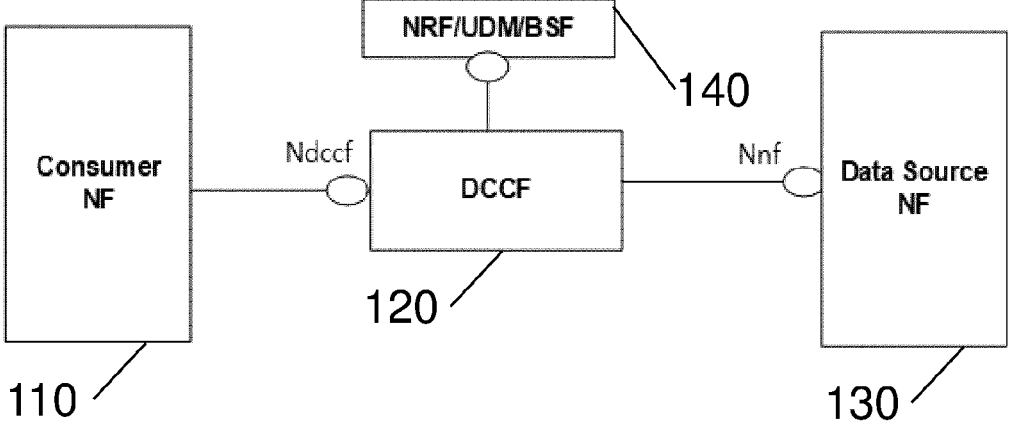
FIG. 1 shows data/analytics collection with data delivery via the DCCF.
Figure 2:
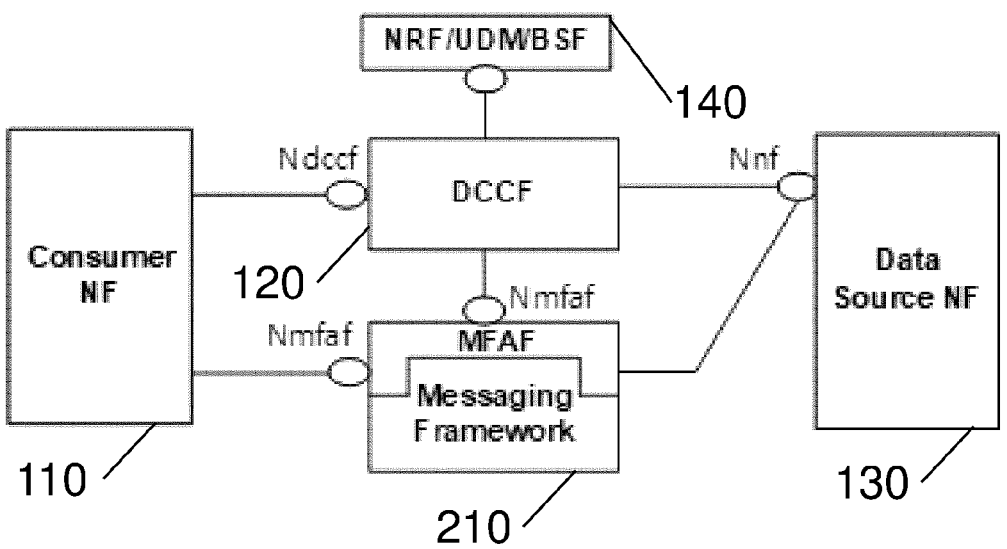
FIG. 2 shows data/analytics collection with data delivery via the MFAF.

Basically, for properly establishing and handling a communication between two or more end points (e.g. communication stations or elements or functions, such as terminal devices, user equipments (UEs), or other communication network elements, a database, a server, host etc.), one or more network elements or functions (e.g. virtualized network functions), such as communication network control elements or functions, for example access network elements like access points (APs), radio base stations (BSs), relay stations, eNBs, gNBs etc., and core network elements or functions, for example control nodes, support nodes, service nodes, gateways, user plane functions, access and mobility functions etc., may be involved, which may belong to one communication network system or different communication network systems.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks like 4G and/or LTE (and even 6G) where mobile communication principles are integrated, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc., Furthermore, without loss of generality, the description of some examples of embodiments is related to a mobile communication network, but principles of the disclosure can be extended and applied to any other type of communication network, such as a wired communication network or data-center networking.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele) communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit (CU), which controls a respective coverage area or cell(s) and with which one or more communication stations such as communication elements or functions, like user devices (e.g. customer devices), mobile devices, or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, (core) network elements or network functions ((core) network control elements or network functions, (core) network management elements or network functions), such as gateway network elements/functions, mobility management entities, network data analytics functions, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a mobile device, a terminal device, control elements or functions, such as access network elements, like a base station (BS), an eNB/gNB, a radio network controller, a core network control element or function, such as a gateway element, or other network elements or functions, as described herein, (core) network management element or function and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

According to various examples of embodiments, the following may be considered:

When a DCCF coordinates data or analytics collection related to a UE or a group of UEs, the DCCF subscribes to event notifications for UE mobility to outside of the serving area of the DCCF (for example area of interest as specified in 3GPP TS 23.502, clause 4.15.4.2). If an MFAF is used, the DCCF also subscribes to receive notifications of UE mobility to outside of the serving area of the selected MFAF.

When a DCCF coordinating data or analytics collection receives a mobility event notification, according to at least some examples of embodiments, the following may be considered:

it determines if the UE is still within the current DCCF serving area. If not, it determines a new DCCF (e.g.: by querying the NRF). It then interacts with the new DCCF to transfer the UE DCCF context for the UE.

Alternatively or in addition, it determines if the UE is within the current MFAF serving area. If not, it determines a new MFAF (e.g.: by querying the NRF). The DCCF then interacts with the old and new MFAFs to transfer the UE MFAF context or establish a new UE MFAF context.

When a DCCF receives a request from another DCCF to take over the coordination for a particular UE, according to at least some examples of embodiments, the following may be considered:

it determines if the UE is within its serving area. If yes, it accepts the request and interacts with the old DCCF to transfer the UE DCCF context for the UE.

Alternatively or in addition, it determines if the UE is within the new MFAF serving area. If it is, the DCCF interacts with the new MFAF to complete the transfer of the UE MFAF context or establish a new UE MFAF context.

When the notification endpoint has changed (there is a new MFAF or new DCCF that receives notifications from the data source), according to at least some examples of embodiments, the DCCF updates the Data Source with the new Notification Endpoint address. Subsequently, the data source sends notifications to the new DCCF or new MFAF.

Alternatively, according to at least some examples of embodiments, the MFAF may subscribe to receive notifications of UE mobility, determine that the UE is outside of the MFAF serving area, discover a new MFAF (e.g.: by querying the NRF), initiate an MFAF UE context transfer and inform the DCCF. The DCCF then interacts with the Data Source to update the Notification Endpoint address (as per above).

According to at least some examples of embodiments, the following is to be noted:

Namely, MFAF UE Context information transferred or setup in the new MFAF may include information from on-going processing, such as buffered notifications and processed data, and configuration information such as Formatting Instructions, Processing Instructions, Data Consumer or Analytics Consumer information and MFAF notification information as described in 3GPP TS 23.288 clause 9.2.2.

Further, DCCF UE Context information transferred to the new DCCF may include information from on-going processing, such as buffered notifications and processed data, and configuration information such as Service Operation, Analytics or Data Specification, Time Window, Formatting Instructions, Processing Instructions, Data Consumer or Analytics Consumer information and MFAF notification information as described in 3GPP TS 23.288 clause 8.2.2.

Figure 3:
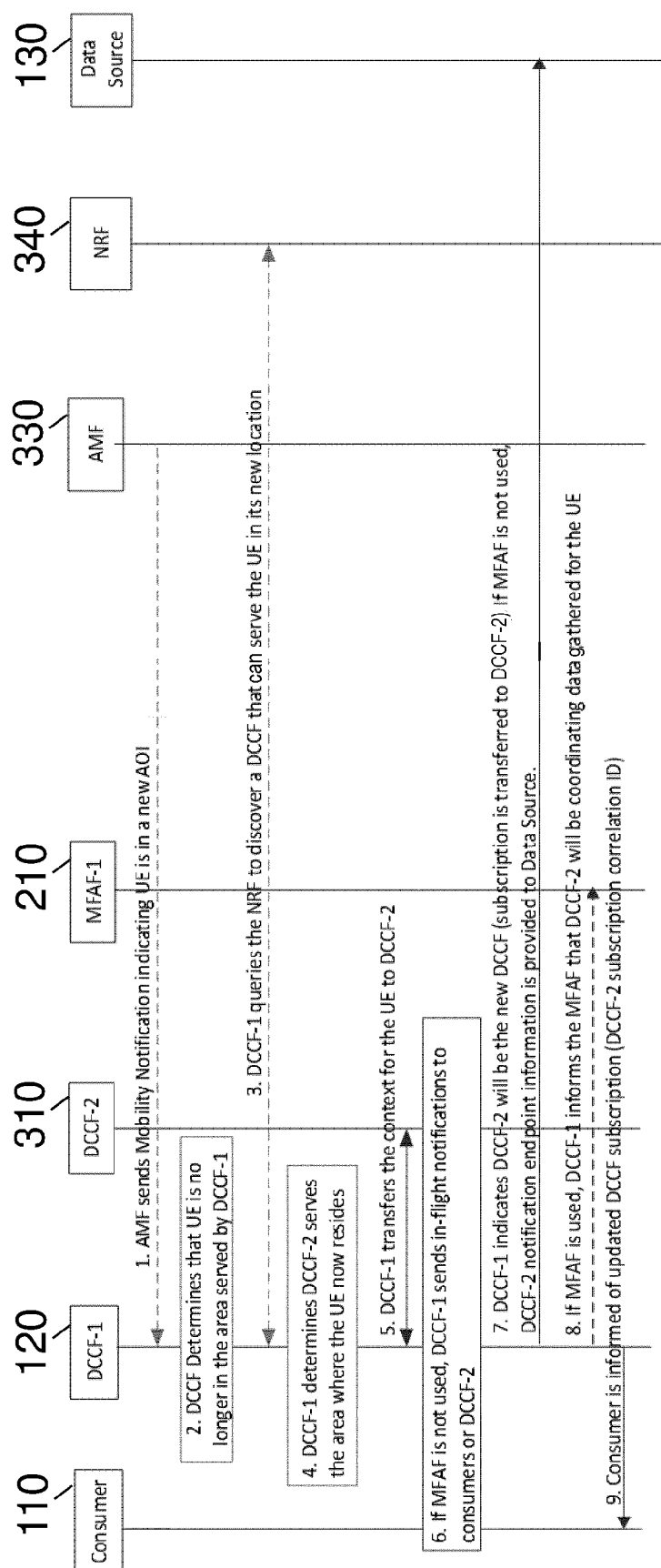
FIG. 3 shows a signaling diagram, illustrating transfer of DCCF UE context when the UE moves from a serving area of a first DCCF, DCCF-1, to a serving area of a second DCCF, DCCF-2 considering a MFAF is not changed or a MFAF is not deployed, according to various examples of embodiments.
Figure 4:
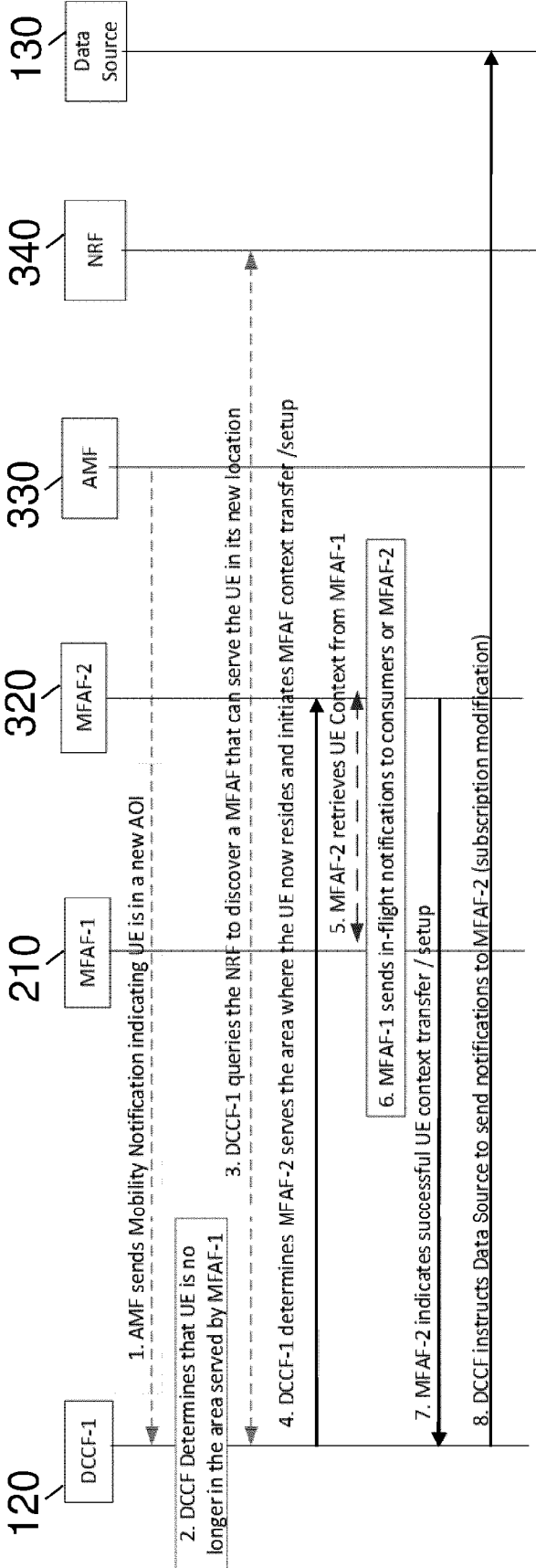
FIG. 4 shows a signaling diagram, illustrating transfer of MFAF UE context or establishment of new MFAF context when the UE moves from a serving area of a first MFAF, MFAF-1, to a serving area of a second MFAF, MFAF-2 and is still within the serving area of a DCCF, according to various examples of embodiments.
Figure 5:
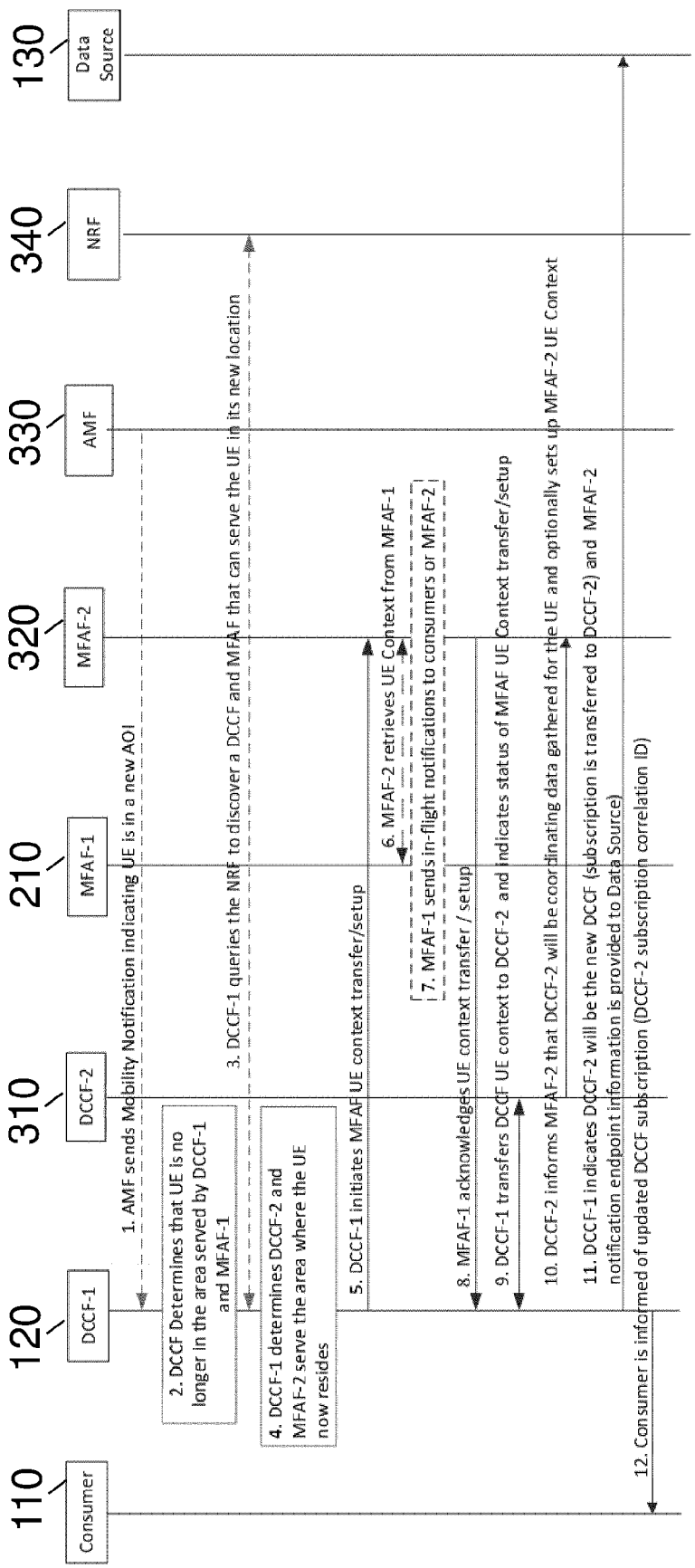
FIG. 5 shows a signaling diagram, illustrating transfer of MFAF UE context or establishment of new MFAF context and transfer of DCCF UE context when the UE moves from a serving area of a first DCCF, DCCF-1, and a first MFAF, MFAF-1, to a serving area of a second DCCF, DCCF-2, and a second MFAF, MFAF-2, according to various examples of embodiments.

According to at least some examples of embodiments, the following FIGS. 3 to 5 illustrate procedures when due to UE mobility, (see FIG. 3) the DCCF changes, (see FIG. 4) the MFAF changes, and (see FIG. 5) both the DCCF and the MFAF change.

Moreover, according to various examples of embodiments, it shall be noted that for the procedures as illustrated according to FIGS. 3 to 5, at least some of the following pre-conditions may be satisfied. Namely, a Data Consumer or Analytics Consumer (e.g. Consumer 110) is subscribed to a DCCF-1 120, wherein the DCCF-1 120 is registered to receive notifications from an AMF 330. Furthermore, the DCCF-1 120 has a configured MFAF-1 210, if a MFAF is used. Additionally, the DCCF-1 120 is subscribed to a Data Source 130 and the Data Source 130 is configured to send a notification to the DCCF-1 120, if no MFAF is used, or to the MFAF-1 210, if a MFAF is used.

Referring now to FIG. 3, FIG. 3 shows a signaling diagram, illustrating transfer of DCCF UE context when the UE moves outside the serving area of a DCCF (DCCF-1 120) considering MFAF-1 210 is not changed or MFAF is not deployed, according to various examples of embodiments.

Furthermore, according to at least some examples of embodiments, FIG. 3 is outlined in more detail with reference to the numbering running from step 1 to step 9 as illustrated in FIG. 3.

In this regard, steps 1 to 4 represent steps used by other NFs to relocate a NF UE context. In more detail, in step 1, the AMF 330 sends a mobility notification to the DCCF-1 120 indicating that a UE is in a new area of interest (AOI). In step 2, the DCCF-1 120 determines that the UE is no longer in the area served by the DCCF-1 120. In step 3, the DCCF-1 120 queries the NRF 340 to discover a DCCF that can serve the UE in the UE's new location. In step 4, the DCCF-1 120 determines/selects the DCCF-2 310, which serves the area where the UE now resides.

Further, in step 5, the DCCF-1 120 requests a transfer of the DCCF UE context to the DCCF-2 310. Such request may already contain the DCCF UE context, which is to be transferred. Alternatively, the DCCF UE context may be transferred separated from such request, e.g. after the request has been issued to the DCCF-2 310. In addition, such separate transfer of the DCCF UE context may be performed in response to the DCCF-1 120 receiving an acceptance notification, e.g. from the DCCF-2 310, or may be performed after elapse of a predetermined time period from issuing the transfer request. The DCCF-2 310 accepts the transfer request. If a MFAF is not used (MFAF-1 210 is not used) and the DCCF-2 310 provides DCCF-2 Notification Endpoint information comprising a (notification URI) and, optionally, notification correlation Id, in the response to the DCCF-1 120.

In step 6, if the MFAF is not used, the DCCF-1 120 either continues to send notifications to the Consumer 110, or forwards notifications to the DCCF-2 310 (e.g. when formatting and processing is needed at the DCCF-2 310).

In step 7, the DCCF-1 120 sends to the Data Source 130 an indication that DCCF-2 310 will be the new DCCF. If the MFAF is not used, DCCF-1 120 also sends to the Data Source 130 Notification Endpoint Information indicating that DCCF-2 310 is the new notification endpoint. The Data Source 130 sends subsequent notifications to the (new) notification endpoint.

In step 8, if the MFAF is used (i.e. if the MFAF-1 210 is used), the DCCF-1 120 (or alternatively the DCCF-2 310) informs the MFAF-1 210 that the DCCF-2 310 will be coordinating data gathered for the UE. Otherwise (i.e. MFAF is not used), this step is skipped.

In step 9, the Consumer 110 is informed by the DCCF-1 120 (or alternatively by the DCCF-2 310) that the subscription to the DCCF-1 120 is now being handled by the DCCF-2 310.

Therefore, according to at least some examples of embodiments, the above-outlined apparatuses and/or methods with reference to FIG. 3 enable DCCF-DCCF coordination. In particular, an efficient, reliable, flexible and/or robust solution is provided for solving the problems related to DCCF-DCCF coordination, if a DCCF is supposed to change, whereas a MFAF does not change (or when no MFAF is used).

Referring now to FIG. 4, FIG. 4 shows a signaling diagram, illustrating transfer of MFAF UE context or establishment of new MFAF context when the UE moves outside the serving area of a MFAF, and is still within the serving area of the DCCF-1 120, according to various examples of embodiments.

Furthermore, according to at least some examples of embodiments, FIG. 4 is outlined in more detail with reference to the numbering running from step 1 to step 8 as illustrated in FIG. 4.

In this regard, in step 1, the AMF 330 sends a mobility notification to the DCCF-1 120 indicating that a UE is in a new AOI. In step 2, the DCCF-1 120 determines that the UE is no longer in the area served by the MFAF-1 210. In step 3, the DCCF-1 120 queries the NRF 340 to discover a MFAF that can serve the UE in the UE's new location.

Further, in step 4, according to various examples of embodiments, two options are to be considered:

(i) In step 4, the DCCF-1 120 sets up the required UE context information in the MFAF-2 320. In this case, step 5 (as outlined below) may be skipped.

(ii) In step 4, the DCCF-1 120 indicates to the MFAF-2 320 that the MFAF-2 320 should retrieve the MFAF UE context from the MFAF-1 210. In this case, step 5 (as outlined below) is executed.

In this regard, in step 4, the DCCF-1 120 selects MFAF-2 320 to serve the UE and sends a message to the MFAF-2 320 either (i) setting up the UE MFAF context, or (ii) instructing the MFAF-2 320 to retrieve the MFAF UE context from the MFAF-1 210.

In step 5, if indicated by the DCCF-1 120 in step 4, the MFAF-2 320 retrieves the MFAF UE context from the MFAF-1 210.

In step 6, the MFAF-1 210 either continues to send notifications to the Consumer 110, or forwards notifications to the MFAF-2 320 (e.g. when formatting and processing is needed at the MFAF-2 320).

In step 7, the MFAF-2 320 indicates to the DCCF-1 120 that the MFAF UE context transfer/setup is complete.

In step 8, the DCCF-1 120 sends the Notification Endpoint Information of the MFAF-2 320 to the Data Source 130. The Data Source 130 sends subsequent notifications to the MFAF-2 320.

Therefore, according to at least some examples of embodiments, the above-outlined apparatuses and/or methods with reference to FIG. 4 enable DCCF-DCCF coordination. In particular, an efficient, reliable, flexible and/or robust solution is provided for solving the problems related to DCCF-DCCF coordination, if a MFAF changes, whereas a DCCF does not change.

Referring now to FIG. 5, FIG. 5 shows a signaling diagram, illustrating transfer of MFAF UE context or establishment of new MFAF context and transfer of DCCF UE context when the UE moves outside the serving areas of both the DCCF and MFAF.

Furthermore, according to at least some examples of embodiments, FIG. 5 is outlined in more detail with reference to the numbering running from step 1 to step 12 as illustrated in FIG. 5.

In this regard, in step 1, the AMF 330 sends a mobility notification to the DCCF-1 120 indicating that a UE is in a new AOI. In step 2, the DCCF-1 120 determines that the UE is no longer in the area served by the MFAF-1 210 and no longer in the area served by the MFAF-1 210. In step 3, the DCCF-1 120 queries the NRF 340 to discover a DCCF and a MFAF that can serve the UE in the UE's new location. The query by DCCF-1 120 may involve separate messaging to discover DCCFs and MFAFs. In step 4, the DCCF-1 120 determines/selects the DCCF-2 310 and the MFAF-2 320, which serve the area where the UE now resides.

Further, in step 5, according to various examples of embodiments, three options are to be considered:

(i) In step 5, the DCCF-1 120 sets up the required UE context information in the MFAF-2 320. In this case, step 6 (as outlined below) is skipped.

(ii) In step 5, the DCCF-1 120 indicates to the MFAF-2 320 that the MFAF-2 320 should retrieve the MFAF UE context from the MFAF-1 210. In this case, step 6 (as outlined below) is executed.

(iii) In step 5, the DCCF-1 120 indicates to the MFAF-2 320 that the DCCF-2 310 will provide the MFAF UE context. In this case, step 6 (as outlined below) is skipped, MFAF UE context information is provided from the DCCF-1 120 to the DCCF-2 310 in step 9 (as outlined below) and the DCCF-2 310 sets up the required UE context information in the MFAF-2 320 in step 10 (as outlined below).

In this regard, in step 5, the DCCF-1 120 selects the MFAF-2 320 to serve the UE and sends a message to the MFAF-2 320 either (i) setting up the UE MFAF context, or (ii) instructing the MFAF-2 320 to retrieve the MFAF UE context from the MFAF-1 210 or (iii) indicating that the DCCF-2 310 will setup the required UE context.

In step 6, if indicated by the DCCF-1 120 in step 5, the MFAF-2 320 obtains the MFAF UE context from the MFAF-1 210. Otherwise, this step is skipped. In this regard, it shall be noted that the MFAF-2 320 may obtain, like e.g. retrieve, the MFAF UE context from the MFAF-1 210 by issuing a retrieval request and by receiving a retrieval response in response thereto. Such retrieval response may already contain the MFAF UE context to be retrieved. Alternatively, the MFAF UE context may be obtained, in that it may be provided to the MFAF-2 320 separated from the retrieval response.

In step 7, the MFAF-1 210 either continues to send notifications to the Consumer 110, or forwards notifications to the MFAF-2 320 (e.g. when formatting and processing is needed at the MFAF-2 320).

In step 8, the MFAF-2 320 indicates to the DCCF-1 120 that MFAF UE context transfer/setup is complete or accepts the pending MFAF UE context setup coming from the DCCF-2 310 in step 10.

In step 9, the DCCF-1 120 requests a transfer of the DCCF UE context to the DCCF-2 310. Similar to step 5 as outlined above with reference to FIG. 3, such request may already contain the DCCF UE context, which is to be transferred. Alternatively, the DCCF UE context may be transferred separated from such request, e.g. after the request has been issued to the DCCF-2 310. In addition, such separate transfer of the DCCF UE context may be performed in response to the DCCF-1 120 receiving an acceptance notification, e.g. from the DCCF-2 310, or may be performed after elapse of a predetermined time period from issuing the transfer request.

In step 10, the DCCF-2 310 informs the MFAF-2 320 that the DCCF-2 310 is now the DCCF serving the UE and sets up the UE context in the MFAF-2 320, if the context was not provided in step 5 or transferred in step 6. Alternatively, the DCCF-1 120 sends the message informing the MFAF-2 320 that the DCCF-2 310 is now the new DCCF serving the UE.

In step 11, the DCCF-1 120 (or alternatively DCCF-2 210) updates the Data Source 130 with MFAF-2 Notification Endpoint Information indicating that the DCCF-2 310 is the new DCCF subscribing for data/analytics.

In step 12, the Consumer 110 is informed by the DCCF-1 120 (or alternatively by the DCCF-2 310) that its subscription to the DCCF-1 120 is now being handled by the DCCF-2 310.

Therefore, according to at least some examples of embodiments, the above-outlined apparatuses and/or methods with reference to FIG. 5 enable DCCF-DCCF coordination. In particular, an efficient, reliable, flexible and/or robust solution is provided for solving the problems related to DCCF-DCCF coordination, if a DCCF and a MFAF change.

According to at least some examples of embodiments, with regard to step 5 of FIG. 5, it shall be noted that it may not necessarily be the DCCF-1 120, which selects the MFAF-2 320 to serve the UE. Rather, in a (alternative) separate/individual step, the DCCF-2 310 may determine the MFAF-2 320, which (the MFAF-2 320) serves the area where the UE now resides. Accordingly, the DCCF-2 310 may select the MFAF-2 320. Hence, the DCCF-2 310 (and not necessarily the DCCF-1 120) may inform/instruct the MFAF-2 320 accordingly in view of the MFAF UE context.

In the following, further examples of embodiments are described in relation to the above described methods and/or apparatuses.

Figure 6:
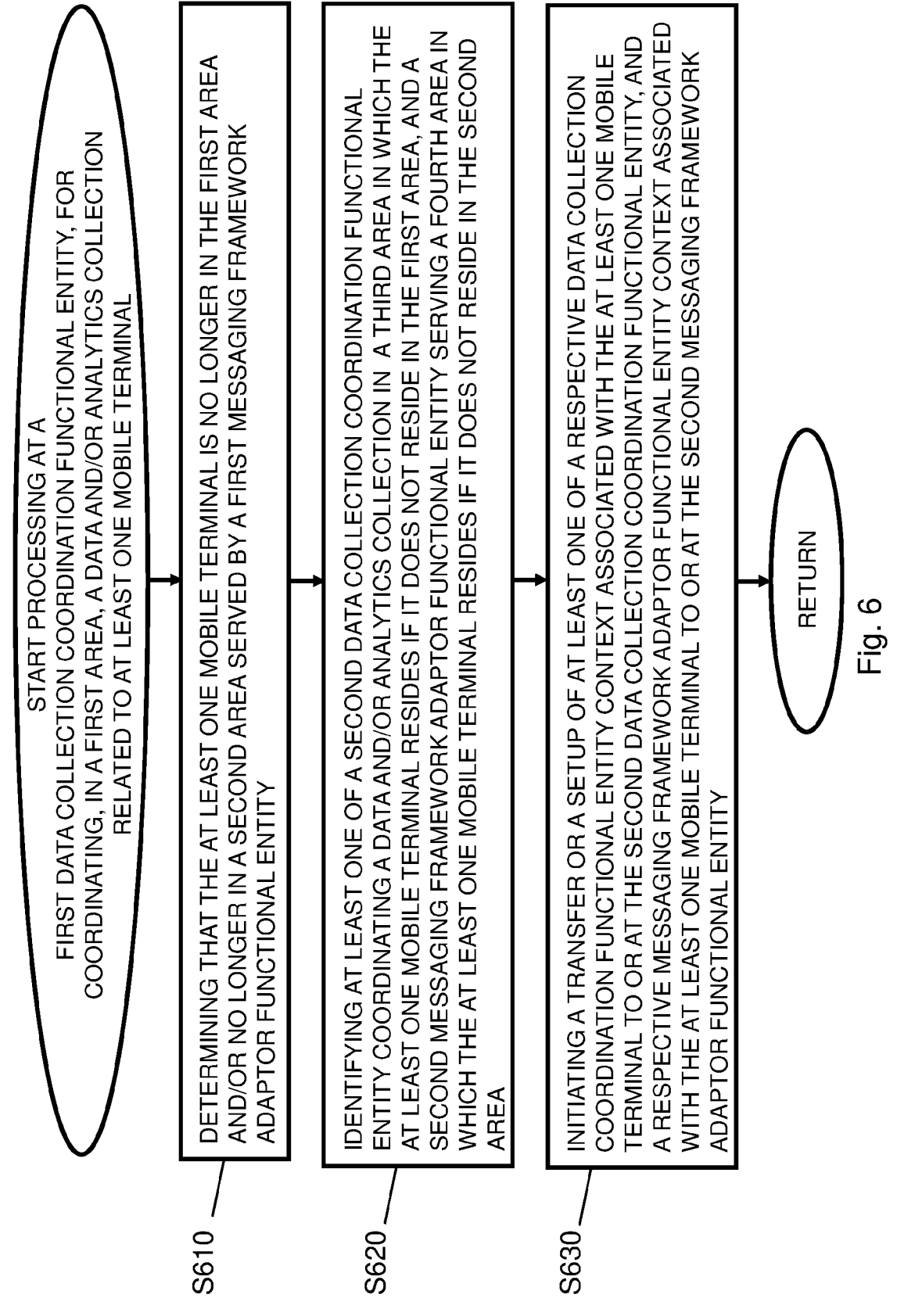
FIG. 6 shows a flowchart illustrating steps corresponding to a method according to various examples of embodiments.

Referring now to FIG. 6, there is shown a flowchart illustrating steps corresponding to a method according to various examples of embodiments. Such method may be executable by an apparatus corresponding to e.g. such DCCF-1 120 as outlined above with reference to FIGS. 1 to 5. Further, such illustrated steps may correspond to such steps described in relation to such DCCF-1 120 as outlined above with reference to FIGS. 1 to 5.

In particular, according to FIG. 6, the method may be executable at a first data collection coordination functional entity for coordinating, in a first area, a data and/or analytics collection related to at least one mobile terminal.

It shall be noted that the first data collection coordination functional entity may represent such DCCF-1 120 as outlined above with reference to FIGS. 1 to 5. Further, the at least one mobile terminal may represent such UE as mentioned/described above with reference to FIGS. 1 to 5.

Further, in S610, the method comprises determining, based on an obtained mobile terminal mobility event notification, that the at least one mobile terminal is no longer in the first area and/or no longer in a second area served by a first messaging framework adaptor functional entity.

It shall be noted that the obtained mobile terminal mobility event notification may represent such mobility notification as outlined above with reference to step 1 according to FIGS. 3 to 5. Further, the first messaging framework adaptor functional entity may represent such MFAF-1 210 as mentioned/described above with reference to FIGS. 1 to 5. Moreover, the determining may represent such step 2 as outlined above with reference to FIGS. 3 to 5.

Additionally, in S620, the method comprises identifying at least one of a second data collection coordination functional entity coordinating a data and/or analytics collection in a third area in which the at least one mobile terminal resides if it does not reside in the first area, and a second messaging framework adaptor functional entity serving a fourth area in which the at least one mobile terminal resides if it does not reside in the second area.

It shall be noted that the second data collection coordination functional entity may represent such DCCF-2 310 as outlined above with reference to FIGS. 3 to 5. Further, the second messaging framework adaptor functional entity may represent such MFAF-2 320 as outlined above with reference to FIGS. 3 to 5. Moreover, the identifying may represent such step 4 as outlined above with reference to FIGS. 3 to 5.

Further, in S630, the method comprises initiating a transfer or a setup of at least one of a respective data collection coordination functional entity context associated with the at least one mobile terminal to or at the second data collection coordination functional entity and a respective messaging framework adaptor functional entity context associated with the at least one mobile terminal to or at the second messaging framework adaptor functional entity.

It shall be noted that the initiating may represent such step 5 as outlined above with reference to FIGS. 3 and 5 or such step 4 as outlined above with reference to FIG. 4.

Moreover, according to at least some examples of embodiments, wherein if it may be determined that the at least one mobile terminal is no longer in the first area; and if it may be identified that the second data collection coordination functional entity coordinates a data and/or analytics collection in the third area in which the at least one mobile terminal resides, the initiating may comprise the following. Issuing a transfer request to the second data collection coordination functional entity for transfer of the respective data collection coordination functional entity context from the first data collection coordination functional entity to the second data collection coordination functional entity, wherein the issued transfer request contains the respective data collection coordination functional entity context to be transferred. Alternatively, the initiating may comprise issuing a transfer request to the second data collection coordination functional entity for transfer of the respective data collection coordination functional entity context from the first data collection coordination functional entity to the second data collection coordination functional entity; and further transferring the respective data collection coordination functional entity context to the second data collection coordination functional entity based on the issued transfer request.

It shall be noted that the initiating may represent such step 5 as outlined above with reference to FIG. 3.

Furthermore, according to various examples of embodiments, the method may further comprise, if the data and/or analytics collection is coordinated via the first data collection coordination functional entity, either sending a notification to a data consumer or analytics consumer subscribed to the first data collection coordination functional entity, or forwarding the notification to the second data collection coordination functional entity.

It shall be noted that the sending/forwarding may represent such step 6 as outlined above with reference to FIG. 3.

Additionally, according to various examples of embodiments, wherein the transfer response may comprises at least notification endpoint information indicating a new endpoint for receiving at least one notification in relation to the at least one mobile terminal. Furthermore, the method may further comprise transmitting the notification endpoint information to a data source, wherein if the data and/or analytics collection is coordinated via the first data collection coordination functional entity, the notification endpoint information indicates that the second data collection coordination functional entity represents the new notification endpoint in relation to the at least one mobile terminal.

It shall be noted that the transmitting may represent such step 7 as outlined above with reference to FIG. 3. Moreover, it shall be noted that the data source may represent e.g. such Data Source 130 as outlined above with reference to FIGS. 3 to 5. Moreover, such data source may represent a management network entity or function such as an OAM, or may represent a network entity or function such as a 5GC NF, like e.g. a AMF, SMF, Policy Control Function (PCF) or a NWDAF.

Optionally, according to at least some examples of embodiments, the method may further comprise, if the data and/or analytics collection is performed via the first messaging framework adaptor functional entity and the at least one mobile terminal resides in the third area, informing the first messaging framework adaptor functional entity that the second data collection coordination functional entity coordinates a data and/or analytics collection related to the at least one mobile terminal.

It shall be noted that the informing may represent such step 8 as outlined above with reference to FIG. 3.

Further, according to various examples of embodiments, the method may further comprise notifying a data consumer or analytics consumer subscribed to the first data collection coordination functional entity that a respective subscription of the at least one mobile terminal to the first data collection coordination functional entity is being handled by the second data collection coordination functional entity.

It shall be noted that the notifying may represent such step 9 as outlined above with reference to FIG. 3.

Moreover, according to at least some examples of embodiments, wherein if it may be determined that the at least one mobile terminal is in the first area and no longer in the second area; and if it may be identified that second messaging framework adaptor functional entity serves the fourth area in which the at least one mobile terminal resides; the initiating may comprise the following. Selecting the second messaging framework adaptor functional entity to serve the at least one mobile terminal; and instructing the second messaging framework adaptor functional entity to setup the respective messaging framework adaptor functional entity context, or instructing the second messaging framework adaptor functional entity to retrieve the respective messaging framework adaptor functional entity context from the first messaging framework adaptor functional entity.

It shall be noted that the selecting may represent such step 4 as outlined above with reference to FIG. 4.

Furthermore, according to various examples of embodiments, the method may further comprise receiving an indication from the second messaging framework adaptor functional entity that the setup or the retrieval of the respective messaging framework adaptor functional entity context is completed.

It shall be noted that the receiving may represent such step 7 as outlined above with reference to FIG. 4.

Additionally, according to various examples of embodiments, wherein the indication may comprise at least notification endpoint information indicating that the second messaging framework adaptor functional entity represents a new endpoint for receiving a notification in relation to the at least one mobile terminal. Furthermore, the method may further comprise transmitting the notification endpoint information to a data source.

It shall be noted that the transmitting may represent such step 8 as outlined above with reference to FIG. 4.

Optionally, according to at least some examples of embodiments, wherein if it may be determined that the at least one mobile terminal is no longer in the first area and no longer in the second area; and if it may be identified that the second data collection coordination functional entity coordinates a data and/or analytics collection in the third area and the second messaging framework adaptor functional entity serves the fourth area in which the at least one mobile terminal resides; the initiating may comprise the following. Selecting the second messaging framework adaptor functional entity to serve the at least one mobile terminal; and instructing the second messaging framework adaptor functional entity to setup the respective messaging framework adaptor functional entity context, or instructing the second messaging framework adaptor functional entity to retrieve the respective messaging framework adaptor functional entity context from the first messaging framework adaptor functional entity, or notifying the second messaging framework adaptor functional entity that the second data collection coordination functional entity setups the respective messaging framework adaptor functional entity context.

It shall be noted that the initiating may represent such step 5 as outlined above with reference to FIG. 5.

Further, according to various examples of embodiments, the method may further comprise receiving an indication from the second messaging framework adaptor functional entity that the setup or the retrieval of the respective messaging framework adaptor functional entity context is completed or that a setup request from the second data collection coordination functional entity in relation to setup of the respective messaging framework adaptor functional entity context is awaited and/or accepted.

It shall be noted that the receiving may represent such step 8 as outlined above with reference to FIG. 5.

Moreover, according to at least some examples of embodiments, the method may further comprise issuing a transfer request to the second data collection coordination functional entity for transfer of the respective data collection coordination functional entity context from the first data collection coordination functional entity to the second data collection coordination functional entity, wherein the issued transfer request contains the respective data collection coordination functional entity context to be transferred and/or a status of the setup or the retrieval of the respective messaging framework adaptor functional entity context. Alternatively, the initiating may comprise issuing a transfer request to the second data collection coordination functional entity for transfer of the respective data collection coordination functional entity context from the first data collection coordination functional entity to the second data collection coordination functional entity; and, based on the issued transfer request, further transferring the respective data collection coordination functional entity context to the second data collection coordination functional entity and/or a status of the setup or the retrieval of the respective messaging framework adaptor functional entity context. In addition, the method may comprise receiving a transfer response from the second data collection coordination functional entity; based thereon, transferring the respective data collection coordination functional entity context to the second data collection coordination functional entity; and indicating, to the second data collection coordination functional entity, a status of the setup or the retrieval of the respective messaging framework adaptor functional entity context.

It shall be noted that the issuing may represent such step 9 as outlined above with reference to FIG. 5.

Furthermore, according to various examples of embodiments, the method may further comprise informing the second messaging framework adaptor functional entity that the second data collection coordination functional entity coordinates a data and/or analytics collection related to the at least one mobile terminal.

It shall be noted that the informing may represent such step 10 as outlined above with reference to FIG. 5.

Additionally, according to various examples of embodiments, the method may further comprise obtaining from the second messaging framework adaptor functional entity at least notification endpoint information; and transmitting the notification endpoint information and an indication that the second data collection coordination functional entity will be coordinating data and/or analytics collection related to the at least one mobile terminal, to a data source.

It shall be noted that the transmitting may represent such step 11 as outlined above with reference to FIG. 5.

Moreover, according to at least some examples of embodiments, the method may further comprise notifying a data consumer or analytics consumer subscribed to the first data collection coordination functional entity that a respective subscription of the at least one mobile terminal to the first data collection coordination functional entity is being handled by the second data collection coordination functional entity.

It shall be noted that the notifying may represent such step 12 as outlined above with reference to FIG. 5.

The above-outlined solution allows for DCCF-DCCF coordination, if at least one of a DCCF and a MFAF changes. Therefore, the above-outlined solution is advantageous in that it enables for efficient, secure, robust, failure resistant, and/or flexible DCCF-DCCF coordination.

Referring now to FIG. 7, FIG. 7 shows a flowchart illustrating steps corresponding to a method according to various examples of embodiments. Such method may be executable by an apparatus corresponding to a second data collection coordination functional entity representing e.g. such DCCF-2 210 as outlined above with reference to FIGS. 3 to 5, wherein the apparatus coordinates a data and/or analytics collection in a third area in which at least one mobile terminal resides if it does not reside in a first area in which a data and/or analytics collection is coordinated by a first data collection coordination functional entity. Further, such illustrated steps may correspond to such steps described in relation to such DCCF-2 210 as outlined above with reference to FIGS. 3 to 5. Moreover, the first data collection coordination functional entity may represent such DCCF-1 120 210 as outlined above with reference to FIGS. 1 to 5. Additionally, such at least one mobile terminal may represent such UE as mentioned/described above with reference to FIGS. 1 to 5.

In particular, according to FIG. 7, in S710, the method comprises receiving, from the first data collection coordination functional entity coordinating a data and/or analytics collection related to the at least one mobile terminal, a transfer request for transfer, from the first data collection coordination functional entity to the second data collection coordination functional entity, of a respective data collection coordination functional entity context associated with the at least one mobile terminal residing in the third area.

Moreover, in S720, the method comprises, based on the received transfer request, obtaining the respective data collection coordination functional entity context associated with the at least one mobile terminal.

Furthermore, in S730, the method comprises issuing a transfer response to the first data collection coordination functional entity.

Such transfer response may represent a notification that the requested transfer is accepted and/or may represent a notification that the respective data collection coordination functional entity context is obtained.

Regarding the obtaining, it shall be noted that according to various examples of embodiments, the respective data collection coordination functional entity context may be obtained from the received transfer request, since the received transfer request may already contain the respective data collection coordination functional entity context. Alternatively, the respective data collection coordination functional entity context may be obtained separately, i.e. separated from the received transfer request, e.g. based on an individual signalling/notification received from e.g. the first data collection coordination functional entity.

Further, according to various examples of embodiments, wherein if the data and/or analytics collection may be coordinated via the second data collection coordination functional entity, the transfer response may comprise at least notification endpoint information indicating that the second data collection coordination functional entity represents a new endpoint for receiving at least one notification in relation to the at least one mobile terminal.

It shall be noted that such collecting may represent such step 5 as outlined above with reference to FIG. 3 and/or such step 9 as outlined above with reference to FIG. 5.

Moreover, according to at least some examples of embodiments, wherein if the data and/or analytics collection may be performed via a first messaging framework adaptor functional entity serving a second area in which the at least one mobile terminal resides, wherein the method may further comprise informing the first messaging framework adaptor functional entity that the second data collection coordination functional entity coordinates a data and/or analytics collection related to the at least one mobile terminal.

It shall be noted that such informing may represent such step 8 as outlined above with reference to FIG. 3, if the informing is performed by the second data collection coordination functional entity, representing e.g. such above-outlined DCCF-2 310, instead of by the first data collection coordination functional entity, representing e.g. such above-outlined DCCF-1 120.

Furthermore, according to various examples of embodiments, wherein a residence of the at least one mobile terminal may have changed from a second area served by a first messaging framework adaptor functional entity to a fourth area served by a second messaging framework adaptor functional entity; wherein the method may further comprise the following. Providing selection information to the second messaging framework adaptor functional entity indicating that the second messaging framework adaptor functional entity is selected for serving the at least one mobile terminal residing in the fourth area; and/or informing the second messaging framework adaptor functional entity that the second data collection coordination functional entity coordinates a data and/or analytics collection related to the at least one mobile terminal; and/or optionally one of the following: instructing the second messaging framework adaptor functional entity to setup a respective messaging framework adaptor functional entity context associated with the at least one mobile terminal, or instructing the second messaging framework adaptor functional entity to obtain the respective messaging framework adaptor functional entity context associated with the at least one mobile terminal from the first messaging framework adaptor functional entity, or setting up a respective messaging framework adaptor functional entity context associated with the at least one mobile terminal at the second messaging framework adaptor functional entity, if the respective messaging framework adaptor functional entity context was not yet provided to the second messaging framework adaptor functional entity.

It shall be noted that such informing may represent such step 10 as outlined above with reference to FIG. 5.

Additionally, according to various examples of embodiments, the method may further comprise obtaining at least a notification endpoint information; and transmitting the notification endpoint information and an indication that the second data collection coordination functional entity will be coordinating a data and/or analytics collection related to the at least one mobile terminal, to a data source to a data source.

It shall be noted that such transmitting may represent such step 11 as outlined above with reference to FIG. 5, if the transmitting is performed by the second data collection coordination functional entity, representing e.g. such above-outlined DCCF-2 310, instead of by the first data collection coordination functional entity, representing e.g. such above-outlined DCCF-1 120. Moreover, it shall be noted that the data source may represent e.g. such Data Source 130 as outlined above with reference to FIGS. 3 to 5. Moreover, such data source may represent a management network entity or function such as an OAM, or may represent a network entity or function, like e.g. an AMF, SMF, PCF or a NWDAF.

Moreover, according to at least some examples of embodiments, the method may further comprise notifying a data consumer or analytics consumer subscribed to the first data collection coordination functional entity that a respective subscription of the at least one mobile terminal to the first data collection coordination functional entity is being handled by the second data collection coordination functional entity.

It shall be noted that such notifying may represent such step 12 as outlined above with reference to FIG. 5, if the notifying is performed by the second data collection coordination functional entity, representing e.g. such above-outlined DCCF-2 310, instead of by the first data collection coordination functional entity, representing e.g. such above-outlined DCCF-1 120.

The above-outlined solution allows for DCCF-DCCF coordination, if at least one of a DCCF and a MFAF changes. Therefore, the above-outlined solution is advantageous in that it enables for efficient, secure, robust, failure resistant, and/or flexible DCCF-DCCF coordination.

Referring now to FIG. 8, FIG. 8 shows a flowchart illustrating steps corresponding to a method according to various examples of embodiments. Such method may be executable by an apparatus corresponding to a second messaging framework adaptor functional entity representing e.g. such MFAF-2 320 as outlined above with reference to FIGS. 3 to 5, wherein the apparatus serves a fourth area in which at least one mobile terminal resides if it does not reside in a second area served by a first messaging framework adaptor functional entity. Further, such illustrated steps may correspond to such steps described in relation to such MFAF-2 320 as outlined above with reference to FIGS. 3 to 5. Moreover, the first messaging framework adaptor functional entity may represent such MFAF-1 210 as outlined above with reference to FIGS. 2 to 5.

In particular, according to FIG. 8, in S810, the method comprises receiving, at the second messaging framework adaptor functional entity serving the fourth area in which at least one mobile terminal resides if it does not reside in the second area served by the first messaging framework adaptor functional entity, from a data collection coordination functional entity for coordinating a data and/or analytics collection related to at least one mobile terminal, a selection information indicating that the second messaging framework adaptor functional entity is selected for serving the at least one mobile terminal residing in the fourth area. The method further comprises additionally receiving, in S810a, an instruction to setup a respective messaging framework adaptor functional entity context associated with the at least one mobile terminal, or, in S810b, an instruction to obtain the respective messaging framework adaptor functional entity context from a first messaging framework adaptor functional entity for serving a second area, in which the at least one mobile terminal has resided prior to residing in the fourth area, or, in S810c, an indication that the respective messaging framework adaptor functional entity context will be set up.

It shall be noted that the first data collection coordination functional entity may represent such DCCF-1 120 and the second data collection coordination functional entity may represent such DCCF-2 310 as outlined above with reference to FIGS. 1 to 5. Further, the at least one mobile terminal may represent such UE as mentioned/described above with reference to FIGS. 1 to 5.

Further, according to various examples of embodiments, the method may further comprise issuing a retrieval request to the first messaging framework adaptor functional entity for retrieval of the respective messaging framework adaptor functional entity context; based thereon, receiving a retrieval response; and based thereon, obtaining the respective messaging framework adaptor functional entity context from the first messaging framework adaptor functional entity.

It shall be noted that such retrieval may represent such step 6 as outlined above with reference to FIG. 5. In this regard, it shall be noted that the received retrieval response may already contain the respective messaging framework adaptor functional entity context. Thus, the respective messaging framework adaptor functional entity context may be obtained from the received retrieval response, i.e. may be received together with the received retrieval response. Alternatively, the respective messaging framework adaptor functional entity context may be obtained separated from the received retrieval response.

Moreover, according to at least some examples of embodiments, the method may further comprise providing an indication to the data collection coordination functional entity that the setup or the retrieval of the respective messaging framework adaptor functional entity context is completed.

It shall be noted that such providing may represent such step 8 as outlined above with reference to FIG. 5.

Additionally, according to various examples of embodiments, wherein the data collection coordination functional entity may be a first data collection coordination functional entity for coordinating, in a first area, a data and/or analytics collection related to the at least one mobile terminal. Further, the receiving of the selection information may comprise receiving a notification from the first data collection coordination functional entity that a second data collection coordination functional entity for coordinating, in a third area, a data and/or analytics collection related to the at least one mobile terminal, which resides in the third area if it does not reside in the first area, will setup the respective messaging framework adaptor functional entity context. The method may further comprise, based thereon, issuing a setup response that the setup of the respective messaging framework adaptor functional entity context is awaited and/or accepted.

It shall be noted that such receiving and issuing may represent such steps 5 (step 5 iii) in particular) and 8 as outlined above with reference to FIG. 5.

It shall be noted that the second data collection coordination functional entity may represent such DCCF-2 310 as outlined above with reference to FIGS. 3 to 5.

The above-outlined solution allows for DCCF-DCCF coordination, if at least one of a DCCF and a MFAF changes. Therefore, the above-outlined solution is advantageous in that it enables for efficient, secure, robust, failure resistant, and/or flexible DCCF-DCCF coordination.

Referring now to FIG. 9, FIG. 9 shows a block diagram illustrating an apparatus according to various examples of embodiments.

Additionally, according to various examples of embodiments, wherein the data collection coordination functional entity may be a second data collection coordination functional entity for coordinating, in a third area, a data and/or analytics collection related to the at least one mobile terminal. Further, the receiving of the selection information may comprise receiving a notification from the second data collection coordination functional entity that the second data collection coordination functional entity will setup the respective messaging framework adaptor functional entity context. The method may further comprise, based thereon, issuing a setup response that the setup of the respective messaging framework adaptor functional entity context is awaited and/or accepted.

Specifically, FIG. 9 shows a block diagram illustrating an apparatus 900, which may represent a first data collection coordination functional entity, like e.g. such DCCF-1 120 as outlined above with reference to FIGS. 1 to 5, according to various examples of embodiments, which may participate in DCCF-DCCF coordination. Furthermore, even though reference is made to a first data collection coordination functional entity, the first data collection coordination functional entity may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The apparatus 900 shown in FIG. 9 may include a processing circuitry, a processing function, a control unit or a processor 910, such as a CPU or the like, which is suitable to enable DCCF-DCCF-coordination. The processor 910 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 931 and 932 denote input/output (I/O) units or functions (interfaces) connected to the processor or processing function 910. The I/O units 931 and 932 may be a combined unit including communication equipment towards several entities/elements, or may include a distributed structure with a plurality of different interfaces for different entities/elements. Reference sign 920 denotes a memory usable, for example, for storing data and programs to be executed by the processor or processing function 910 and/or as a working storage of the processor or processing function 910. It is to be noted that the memory 920 may be implemented by using one or more memory portions of the same or different type of memory, but may also represent an external memory, e.g. an external database provided on a cloud server.

The processor or processing function 910 is configured to execute processing related to the above described processing. In particular, the processor or processing circuitry or function 910 includes one or more of the following subportions. Sub-portion 911 is a determining portion, which is usable as a portion for determining that the at least one mobile terminal is no longer in first area and/or second area. The portion 911 may be configured to perform processing according to S610 of FIG. 6. Moreover, sub-portion 912 is an identifying portion, which is usable as a portion for identifying at least one of a second data collection coordination functional entity and a second messaging framework adaptor functional entity. The portion 912 may be configured to perform processing according to S620 of FIG. 6. Further, sub-portion 913 is an initiating portion, which is usable as a portion for initiating a transfer or a setup. The portion 913 may be configured to perform processing according to S630 of FIG. 6.

Referring now to FIG. 10, FIG. 10 shows a block diagram illustrating an apparatus according to various examples of embodiments.

Specifically, FIG. 10 shows a block diagram illustrating an apparatus, which may represent a second data collection coordination functional entity, like e.g. such DCCF-2 310 as outlined above with reference to FIGS. 3 to 5, according to various examples of embodiments, which may participate in in DCCF-DCCF-coordination. Furthermore, even though reference is made to a second data collection coordination functional entity, the second data collection coordination functional entity may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The apparatus 1000 shown in FIG. 10 may include a processing circuitry, a processing function, a control unit or a processor 1010, such as a CPU or the like, which is suitable to enable DCCF-DCCF-coordination. The processor 1010 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 1031 and 1032 denote input/output (I/O) units or functions (interfaces) connected to the processor or processing function 1010. The I/O units 1031 and 1032 may be a combined unit including communication equipment towards several entities/elements, or may include a distributed structure with a plurality of different interfaces for different entities/elements. Reference sign 1020 denotes a memory usable, for example, for storing data and programs to be executed by the processor or processing function 1010 and/or as a working storage of the processor or processing function 1010. It is to be noted that the memory 1020 may be implemented by using one or more memory portions of the same or different type of memory, but may also represent an external memory, e.g. an external database provided on a cloud server.

The processor or processing function 1010 is configured to execute processing related to the above described processing. In particular, the processor or processing circuitry or function 1010 includes one or more of the following sub-portions. Sub-portion 1011 is a receiving portion, which is usable as a portion for receiving a setup request. The portion 1011 may be configured to perform processing according to S710 of FIG. 7. Further, sub-portion 1012 is an obtaining portion, which is usable as a portion for obtaining a data collection coordination functional entity context. The portion 1012 may be configured to perform processing according to S720 of FIG. 7. Moreover, sub-portion 1013 is an issuing portion, which is usable as a portion for issuing a transfer response. The portion 1013 may be configured to perform processing according to S730 of FIG. 7.

Figure 11:
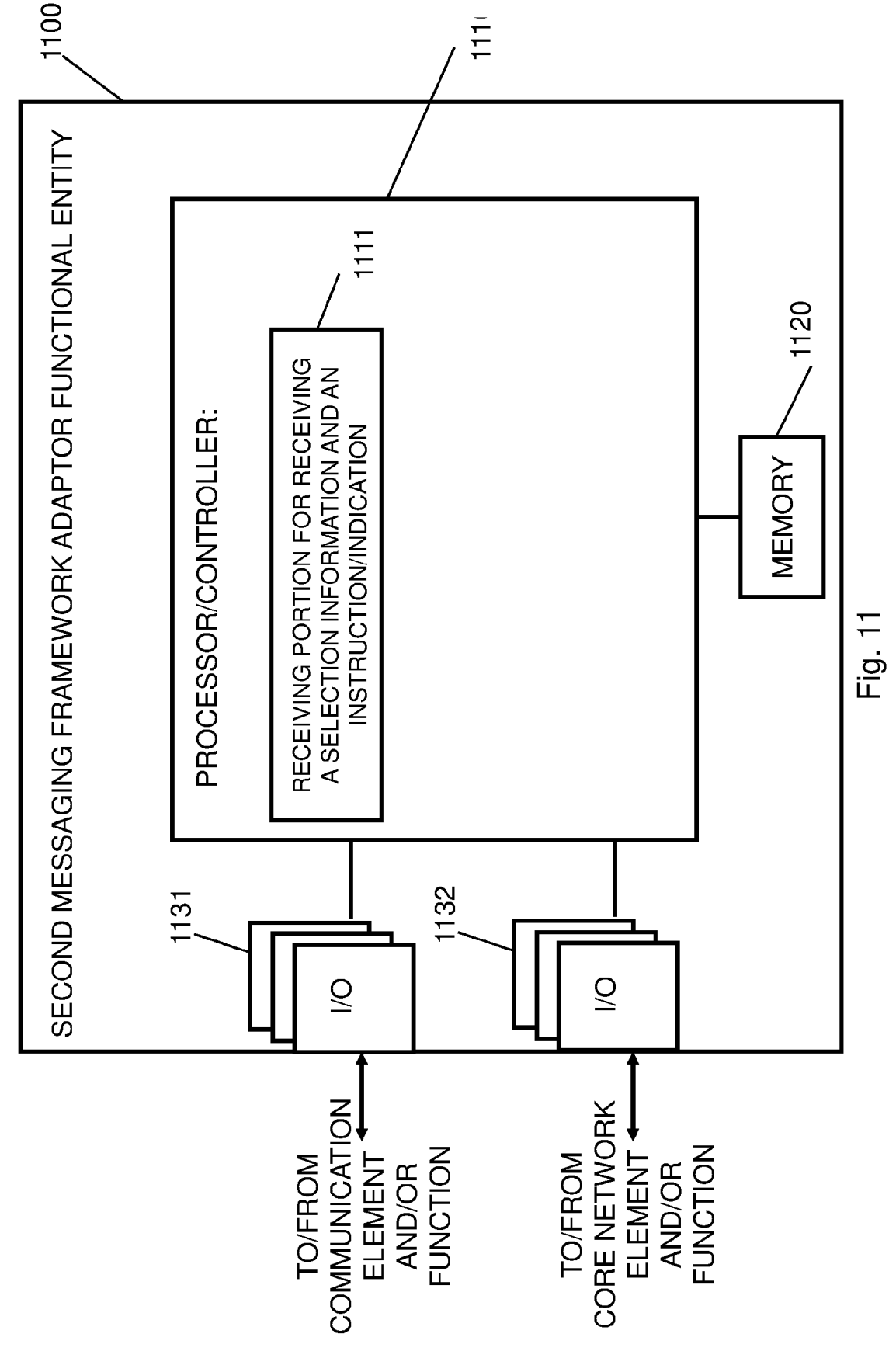
FIG. 11 shows a block diagram illustrating an apparatus according to various examples of embodiments.

Referring now to FIG. 11, FIG. 11 shows a block diagram illustrating an apparatus according to various examples of embodiments.

Specifically, FIG. 11 shows a block diagram illustrating an apparatus, which may represent a second messaging framework adaptor functional entity, like e.g. such MFAF-2 320 as outlined above with reference to FIGS. 2 to 5, according to various examples of embodiments, which may participate in DCCF-DCCF coordination. Furthermore, even though reference is made to a messaging framework adaptor functional entity, the messaging framework adaptor functional entity may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The apparatus 1100 shown in FIG. 11 may include a processing circuitry, a processing function, a control unit or a processor 1110, such as a CPU or the like, which is suitable to enable DCCF-DCCF coordination. The processor 1110 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 1131 and 1132 denote input/output (I/O) units or functions (interfaces) connected to the processor or processing function 1110. The I/O units 1131 and 1132 may be a combined unit including communication equipment towards several entities/elements, or may include a distributed structure with a plurality of different interfaces for different entities/elements. Reference sign 1120 denotes a memory usable, for example, for storing data and programs to be executed by the processor or processing function 1110 and/or as a working storage of the processor or processing function 1110. It is to be noted that the memory 1120 may be implemented by using one or more memory portions of the same or different type of memory, but may also represent an external memory, e.g. an external database provided on a cloud server.

The processor or processing function 1110 is configured to execute processing related to the above described processing. In particular, the processor or processing circuitry or function 1110 includes one or more of the following sub-portions. Sub-portion 1111 is a receiving portion, which is usable as a portion for receiving a selection information and an instruction. The portion 1111 may be configured to perform processing according to S810, S810a and/or S810b of FIG. 8.

It shall be noted that the apparatuses 900, 1000 and 1100 as outlined above with reference to FIGS. 9 to 11 may comprise further/additional sub-portions, which may allow the apparatuses 900, 1000 and 1100 to perform such methods/method steps as outlined above with reference to FIGS. 3 to 5.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. A method comprising:

determining, by a first data collection coordination entity, based on an indication of a new area of interest of a mobile terminal included in a notification of a mobility event of the mobile terminal, that the mobile terminal does not reside in a first area associated with the first data collection coordination entity and does not reside in a second area associated with a first messaging framework adaptor, wherein the mobile terminal is served by the first messaging framework adaptor entity;

identifying, by the first data collection coordination entity, a second data collection coordination entity for coordinating collection of at least one of data or analytics in a third area based on a determination that the mobile terminal resides in the third area and does not reside in the first area;

identifying, by the first data collection coordination entity, a second messaging framework adaptor entity serving a fourth area based on a determination that the mobile terminal resides in the fourth area does not reside in the second area; and initiating, by the first data collection coordination entity, a transfer of context information for a data collection coordination entity associated with the mobile terminal that is stored at the first data collection coordination entity to the second data collection coordination entity;

initiating, by the first data collection coordination entity, a transfer of context information for a messaging framework adaptor entity associated with the mobile terminal that is stored at the first messaging framework adaptor entity to the second messaging framework adaptor entity;

sending, by the first data collection coordination entity, to a data consumer or analytics consumer that has subscribed to the first data collection coordination entity, a notification of the transfer of the context information for a data collection coordination entity associated with the mobile terminal to the second data collection coordination entity, the notification comprising an address of the second data collection coordination entity;

sending, by the first data collection coordination entity to the second data collection coordination entity, a transfer request for transferring the context information for a data collection coordination entity associated with the mobile terminal that is stored at the first data collection entity, wherein the transfer request includes the context information for the data collection entity associated with the mobile; and receiving, by the first data collection coordination entity from the second data collection coordination entity, a transfer response to the transfer request, the transfer response comprising endpoint information indicating that the second data collection coordination entity is a new endpoint for receiving notifications of mobility events of the mobile terminal.

2. The method according to claim 1, further comprising:

forwarding, by the first data collection coordination entity to the second data collection coordination entity, the notification of the transfer of the context information for the data collection coordination entity associated with the mobile terminal.

3. The method according to claim 1, further comprising:

informing, by the first data collection coordination entity, the first messaging framework adaptor entity that the second data collection coordination entity coordinates collection of at least one of data or analytics related to the mobile terminal.

4. The method according to claim 1, further comprising, notifying, in an instance the sending comprises sending to the data consumer, the data consumer that has subscribed to the first data collection coordination entity that a subscription to the first data collection coordination entity for data related to the mobile terminal is being handled by the second data collection coordination entity; or notifying, in an instance the sending comprises sending to the analytics consumer, the analytics consumer that has subscribed to the first data collection coordination entity that a subscription to the first data collection coordination entity for analytics related to the mobile terminal is being handled by the second data collection coordination entity.

5. The method according to claim 1, wherein the initiating the transfer of the messaging framework adaptor entity context comprises:

selecting, by the first data collection coordination entity, the second messaging framework adaptor entity to serve the mobile terminal; and instructing, by the first data collection coordination entity, the second messaging framework adaptor entity to retrieve the context information for a messaging framework associated with the mobile terminal stored at the first messaging framework adaptor entity context from the first messaging framework adaptor entity.

6. The method according to claim 5, further comprising receiving, by the first data collection coordination entity from the second messaging framework adaptor entity an indication indicating that retrieval of the context information for a messaging framework adaptor entity associated with the mobile terminal is completed.

7. The method according to claim 1, further comprising:

receiving, by the first data collection coordination entity, endpoint information indicating that the second messaging framework adaptor entity is a new endpoint for receiving a notification in relation to mobile terminal; and transmitting, by the first data collection coordination entity, the endpoint information to a data source.

8. An apparatus comprising:

at least one processing circuitry; and at least one memory for storing instructions of a first data collection coordination entity, wherein execution of the instructions causes the apparatus perform operations, the operations comprising at least:

determining, based on an indication of a new area of interest of a mobile terminal included in a notification of a mobility event of the mobile terminal, the information indicating that a mobile terminal does not reside in a first area associated with the first data collection coordination entity and does not reside in a second area associated with a first messaging framework adaptor entity, wherein the mobile terminal is served by the first messaging framework adaptor entity;

identifying a second data collection coordination entity for coordinating collection of at least one of data or analytics in a third area based on a determination that the mobile terminal resides in the third area and does not reside in the first area;

identifying a second messaging framework adaptor entity serving a fourth area based on a determination that the mobile terminal resides in the fourth area and does not reside in the second area;

initiating a transfer of context information for a data collection coordination entity associated with the mobile terminal that is stored at the first data collection coordination entity to the second data collection coordination entity;

initiating a transfer of context information for a messaging framework adaptor entity associated with the mobile terminal that is stored at the first messaging framework adaptor entity to the second messaging framework adaptor entity;

sending to a data consumer or analytics consumer that has subscribed to the first data collection coordination entity, a notification of the transfer of the context information for a data collection coordination entity associated with the mobile terminal to the second data collection coordination entity, the notification comprising an address of the second data collection coordination entity;

sending, to the second data collection coordination entity, a transfer request for transferring the context information for a data collection coordination entity associated with the mobile terminal that is stored at the first data collection entity, wherein the transfer request includes the context information for the data collection entity associated with the mobile; and receiving, from the second data collection coordination entity, a transfer response to the transfer request, the transfer response comprising endpoint information indicating that the second data collection coordination entity is a new endpoint for receiving notifications of mobility events of the mobile terminal.

9. The apparatus according to claim 8, further comprising:

forwarding the notification of the transfer of the context information for a data collection coordination entity associated with the mobile terminal to the second data collection coordination entity.

10. The apparatus according to claim 8, wherein the operations further comprise:

informing the first messaging framework adaptor entity that the second data collection coordination entity coordinates collection of at least one of data or analytics related to the mobile terminal.

11. The apparatus according to claim 8, wherein the operations further comprise:

notifying, in an instance the sending comprises sending to the data consumer, the data consumer that has subscribed to the first data collection coordination entity that a subscription to the first data collection coordination entity for data related to the mobile terminal is being handled by the second data collection coordination entity; or notifying, in an instance the sending comprises sending to the analytics consumer, the analytics consumer that has subscribed to the first data collection coordination entity that a subscription to the first data collection coordination entity for analytics related to the mobile terminal is being handled by the second data collection coordination entity.

12. The apparatus according to claim 8, wherein the initiating the transfer of the context information for a messaging framework adaptor entity associated with the mobile terminal that is stored at the first data collection coordination entity to the second data collection coordination entity comprises:

selecting the second messaging framework adaptor entity to serve the mobile terminal; and instructing the second messaging framework adaptor entity to retrieve the context information for a messaging framework adaptor entity associated with the mobile terminal context from the first messaging framework adaptor entity.

13. The apparatus according to claim 12, wherein the operations further:

receiving from the second messaging framework adaptor entity an indication indicating that the retrieval of the context information for a messaging framework adaptor entity associated with the mobile terminal is completed.

14. The apparatus according to claim 8, wherein the operations further comprise:

receiving endpoint information indicating that the second messaging framework adaptor entity is a new endpoint for receiving a notification in relation to mobile terminal; and transmitting the endpoint information to a data source.

15. A non-transitory computer-readable medium storing instructions of a first data collection coordination entity, wherein execution of the instructions by at least one processor of an apparatus causes the apparatus perform operations, the operations comprising at least:

determining, based on an indication of a new area of interest of a mobile terminal included in a notification of a mobility event of the mobile terminal, the information indicating that the mobile terminal does not reside in a first area associated with the first data collection coordination entity and does not reside in a second area associated with a first messaging framework adaptor, wherein the mobile terminal is served by the first messaging framework adaptor entity;

identifying a second data collection coordination entity for coordinating collection of at least one of data or analytics in a third area based on a determination that the mobile terminal resides in the third area and does not reside in the first area;

identifying a second messaging framework adaptor entity serving a fourth area based on a determination that the mobile terminal resides in the fourth area and does not reside in the second area;

initiating a transfer of context information for a data collection coordination entity associated with the mobile terminal stored at the first data collection coordination entity to the second data collection coordination entity;

initiating a transfer of context information for a messaging framework adaptor entity associated with the mobile terminal stored at the first messaging framework adaptor entity to the second messaging framework adaptor entity;

sending to a data consumer or analytics consumer that has subscribed to the first data collection coordination entity, a notification of the transfer of the context information for a data collection coordination entity associated with the mobile terminal to the second data collection coordination entity, the notification comprising an address of the second data collection coordination entity;

sending, to the second data collection coordination entity, a transfer request for transferring the context information for a data collection coordination entity associated with the mobile terminal that is stored at the first data collection entity, wherein the transfer request includes the context information for the data collection entity associated with the mobile; and receiving, from the second data collection coordination entity, a transfer response to the transfer request, the transfer response comprising endpoint information indicating that the second data collection coordination entity is a new endpoint for receiving notifications of mobility events of the mobile terminal.

* * * * *